May 17, 1966
R. A. LLOYD
3,251,511
ROTARY VALVE
Filed May 20, 1964
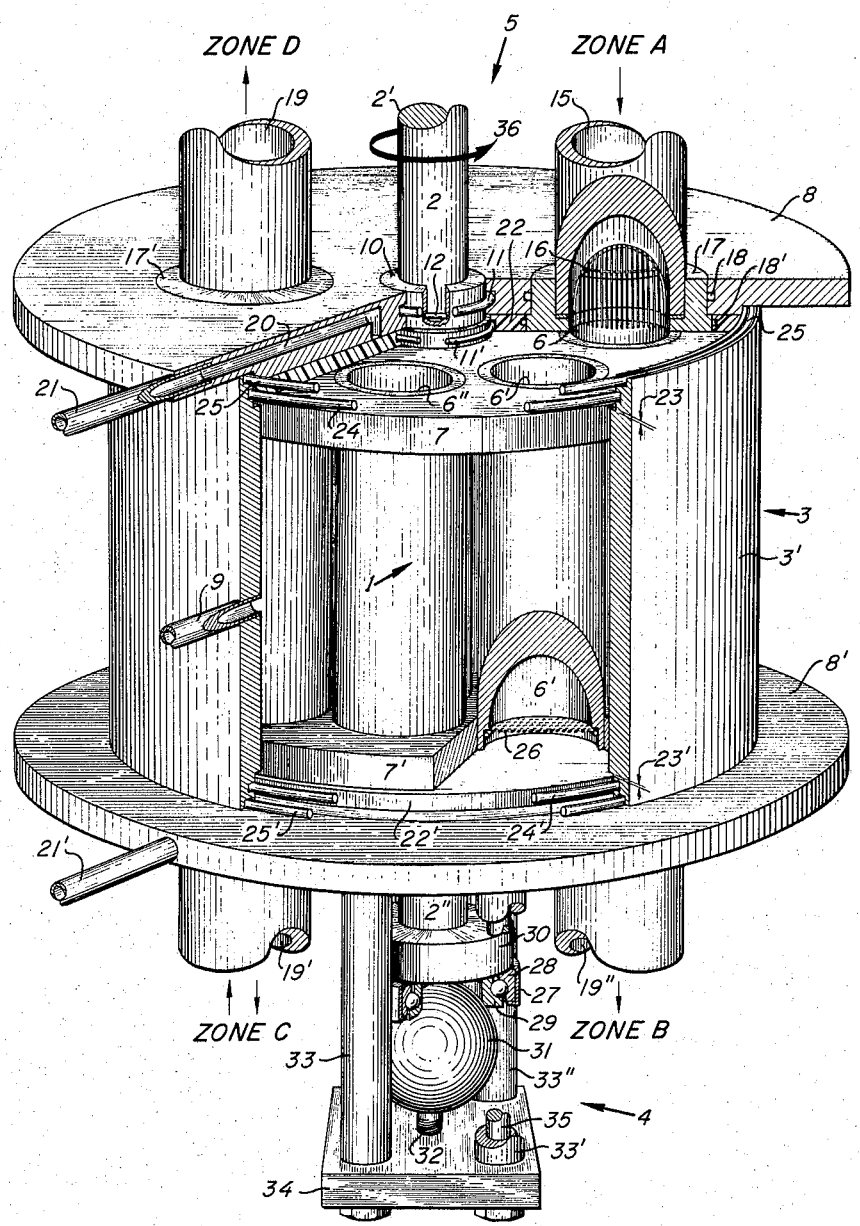
INVENTOR.
ROGER A. LLOYD
BY
*R. Hoffman*
ATTORNEY United States Patent Office 3,251,511
Patented May 17, 1966

3,251,511
ROTARY VALVE
Roger A. Lloyd, Huntsville, Ala., assignor to the United States of America as represented by the Secretary of Agriculture
Filed May 20, 1964, Ser. No. 369,045
3 Claims. (Cl. 222—189)

A nonexclusive, irrevocable, royalty-free license in the invention herein described throughout the world for all purposes of the United States Government, with the power to grant sublicenses for such purposes, is hereby granted to the Government of the United States of America.

This invention relates to a rotary valve, and more particularly to a rotary valve that may provide a means of transferring substance from one zone to a second zone in a system connected to said valve, wherein said second zone may be at a higher, lower, or the same pressure as the first zone. The substance to be transferred by means of this rotary valve may be in the form of particles of matter, fluids, slurries, or any other form apparent to one skilled in the art.

Accordingly, one object of this invention is to provide a means of conducting a variety of substances into a rotary valve through a plurality of ports and pockets, thence transferring said substance from one zone to a second zone at controlled pressures within a system connected thereto.

Another object of this invention shall be to provide a system of seals in a rotary valve to maintain controlled pressures and exclude interference from external pressures without substantially restricting the movements of parts in contact with aforesaid seals.

Another object of this invention shall be to provide a system of diaphragms which intimately contact the rotor faces within a rotary valve, thereby forming dynamic seals against said rotor faces.

Another object of this invention shall be to provide fluid pressure between the housing plates and diaphragms of a rotary valve to maintain uniform and intimate contact between diaphragms and rotor faces.

Another object of this invention shall be to provide an adjustable means of compensating for the coaxial thrust of a rotor shaft, thereby tending to equalize the friction between diaphrgams and rotor faces in a system of dynamic seals.

Another object of this invention shall be to provide within a rotary valve a rotor with a plurality of pockets, each pocket containing a screening member, to permit the separate disposition of fluids and solids.

Another object of this invention shall be to provide a brush-like partition in an inlet port of a rotary valve to permit solid particles to be swept from the trailing edge of a rotor pocket without restricting the flow of a circulating fluid, thereby relieving the rotor from cutting or crushing solid particles.

Further objects will become apparent from the attached description and drawings of which the figure is a cutaway perspective illustration of the assembled embodiments of my invention. The components, configuration, and materials illustrated and described were used for purposes of clarity and are not intended to limit the scope of my invention to less than that of all those equivalents apparent to one skilled in the art.

Referring to the figure, a rotary valve, indicated generally as 5, comprised of rotor 1, vertical rotor shaft 2, housing 3, and bearing assembly 4, is represented with outer parts partially cut away.

Rotor 1 comprises a plurality of vertical tubular pockets 6, 6′, 6″, and others not shown, such that said pockets may be fixedly attached to upper and lower circular rotor flanges 7 and 7′, respectively, and disposed para-axially therebetween at equal intervals on a concentric circle intersecting the axes of all vertical tubular pockets contained in said rotor 1. The lower end of each of the vertical tubular pockets may be provided with a removable screening device, such as 26 shown in pocket 6. Rotor 1 may be coaxially fixed to rotor shaft 2, such that shaft 2 may extend to 2′ and 2″ above upper plate 8 and below lower plate 8′, respectively. Shaft 2 and rotor 1 may be rotatably mounted in and between upper plate 8 and lower plate 8′ by means of upper bearing 10, as illustrated, and an identical lower bearing not shown.

The terms coaxial, coaxially, para-axial, para-axially, abaxial, and abaxially shall hereinafter refer to the axis of rotation of rotor 1, unless specifically excepted.

Upper plate 8 of housing 3 comprises a circular member of substantial and varied thickness, such that a central and concentric portion of said plate may be recessed within cylindrical body 3′ of housing 3 and permit the peripheral remainder of plate 8 to rest upon and project beyond cylindrical body 3′, as illustrated, to provide for some convenient means of fixedly connecting parts 8, 8′, and 3′, such as by bolt connectors, clamps, or the like, not shown for the sake of clarity. In further reference to parts contiguous to upper plate 8, rotor shaft bearing 10 is exposed and partially cut away to illustrate outer-O-ring seals 11 and 11′ and inner dynamic seal 12. Inlet port 15 may be disposed diametrically opposite port 19 on a concentric circle, such that said ports are coaxial to diametrically opposing vertical tubular pockets in rotor 1. Inlet port 15 is partially cut away to expose brush-like partition 16 and coupling 17 sealed by O-rings 18 and 18′. Port 15 and port 19 are substantially alike, except that port 19 does not contain a member corresponding to brush-like partition 16. Partition 16 comprises a plurality of wires, bristles, or the like, disposed to sweep particles from the trailing edge of rotor pockets and removably connected to port 15 and coupling 17, such that partition 16 may permit fluids and small particles to flow through said partition, but larger particles may be diverted directly into the pockets of rotor 1.

A tubular opening 20 in upper plate member 8 extends abaxially a substantial distance from the periphery of member 8 toward the central inner portion of said plate where said opening 20 assumes a downward direction toward upper diaphragm 22 of rotary valve 5, such that tubular opening 20 permits fluid pressure to be received therein through supply tube 21 and applied downward on upper diaphragm 22, forcing said diaphragm into intimate contact with the upper face of rotor flange 7, thus providing a dynamic seal with rotor 1. Vertical clearance 23 inside of body 3′ at the place of alinement of said body with the periphery of upper diaphragm 22 permits said diaphragm to move coaxially, while remaining sealed to contiguous members by means of O-rings 11′, 18′, 24, and another O-ring not shown, thereby providing for intimate register between the lower surface of diaphragm 22 and the upper surface of rotor flange 7.

Upper diaphragm 22 comprises a circular member of substantial thickness provided with openings to receive bearing 10, couplings 17 and 17′, and O-ring seals 11′, 18, and 18′, illustrated in the figure. Material for diaphragms 22 and 22′ may be fiber, metal, synthetic material such as polytetra fluoroethylene, or other material having low-friction bearing properties to provide dynamic seals to the respective faces of rotor flanges 7 and 7′. Lower diaphragm 22′ may function in like manner and may be substantially identical to upper diaphragm 22, except that lower diaphragm 22′ is forced upward against the lower face of rotor flange 7′ when fluid pressure is applied to said diaphragm through supply tube 21′.

Fluid pressure may be supplied to tubes 21 and 21′, from the same source or from individual sources not shown.

Body member 3′ of housing 3 comprises a hollow open vertical cylinder with walls of substantial and uniform thickness containing a system of seals 24, 24′, 25, and 25′, such that rotor 1 may be rotatably contained within cylindrical body 3′, and upper and lower plate members 8 and 8′ may be removably connected to the open ends of said body by means of bolts, clamps, or like connectors, not shown. The upper and lower edges of cylindrical body 3′ are grooved to receive O-rings 25 and 25′ disposed to seal against plate members 8 and 8′, and the inner surfaces near said edges are recessed and grooved for O-rings 24 and 24′, with clearance 23 and 23′ provided to permit coaxial movement of diaphragms 22 and 22′ without interrupting contact between said diaphragms and O-rings 24 and 24′, respectively. Fluid pressure port 9 may be disposed abaxially in body 3′, as illustrated, to permit application of fluid pressure into the cavity between rotor 1 and said body.

Lower plate 8′, complete with openings therein and parts contiguous thereto, may be substantially like upper plate 8, except for brush-like partition 16 to which there is no corresponding member contained in port 19′ or 19″ in lower plate 8′, and except for threaded holes in plate 8′ provided for removably connecting bearing assembly 4 thereto.

Bearing assembly 4 comprises a coaxial low-friction bearing 27, such as a ball-bearing race of the thrust type, or the like, which may be fixedly connected at outer ring member 28 of bearing 27 to supporting member 30 thence removably connected by means of threads, or the like, to extended portion 2″ of rotor shaft 2, such that inner ring member 29 of bearing 27 may be coaxially and rotatably sealed on thrust ball member 31. Ball 31 may then be contained within a space provided by a plurality of para-axial tubular columns 33, 33′, and 33″, and another column not shown, disposed to permit within said space coaxial adjustment of ball 31 by means of coaxial adjusting member 32 connected adjustably to plate 34 by means of screw threads, or the like. Plate 34, disposed parallel to lower plate 8′, may then be removably connected to tubular columns 33, 33′, 33″, and another column not shown, thence to lower plate 8′ by means of bolts, such as bolt 35, extending through holes in plate 34 and through said columns into corresponding threaded holes in lower plate 8′. Thus, ball member 31 may be coaxially adjusted upward to bear on bearing 27, thence to supporting member 30 and rotor shaft extension 2″, and hence to rotor 1, providing a compensating force to oppose downward thrust of rotor 1, thereby tending to equalize friction between diaphragms 22 and 22″ and the faces of rotor flanges 7 and 7′, respectively.

The parts of rotary valve 5 may consist of appropriate materials, such as metals, fibrous material, synthetic material, rubber, elastomers, polymers, glass, or other materials known to the art.

In operation, rotary valve 5 may be removably connected at shaft portion 2′ of shaft 2 to a rotary power source not shown, and may be further attached by means of ports 15, 19, 19′, and 19″ to a system for transferring substance within said system.

In the case of pressure operation, controlled fluid pressure may be applied to ports 15, 19, 19′, and 19″ of rotary valve 5, wherein ports 15 and 19′ may be high-pressure ports, and ports 19 and 19″ may be low-pressure ports. For this type of operation, a screening member like 26 may be in the bottom of each rotor pocket, such that a circulating fluid stream may carry solid particles from zone A in the system through high-pressure port 15 into pocket 6 of rotor 1 and deposit said particles on pocket screen 26. The fluid stream then may pass through pocket screen 26 into zone B in the system through low-pressure port 19″. Rotor 1 then may rotate 180° in direction 36 and a countercirculating fluid stream from zone C directed through high-pressure port 19′ may backwash through pocket screen 26 and pocket 6, thence carry solid particles through low-pressure port 19 and transfer said particles to zone D in the system. During the rotation of rotor 1, brush-like partition 16 sweeps excess particles from the trailing edge of pocket 6 into the following pocket to prevent cutting or crushing said particles and to permit clear fluid that filters through partition 16 to wash away small solid particles that get through said partition.

In the case of gravity operation, a metered quantity of solid particles originating at a source of supply in zone A of the system may fall through inlet port 15 of rotary valve 5 into rotor pocket 6. In this case, pocket screen 26 and all other pocket screens may be removed, and ports 19 and 19″ may remain closed. Rotor 1 may then be rotated 180° in a counterclockwise direction indicated by arrow 36, such that tubular pocket 6 alines with port 19′ to deposit the solid particles herein, and thus said particles may then fall into zone C of the system. During the rotation of rotor 1, brush-like partition 16 sweeps excess particles from the trailing edge of pocket 6 into the following pocket to prevent cutting or crushing of said particles by rotor 1.

In any operation applicable to rotary valve 5, controlled fluid pressure transferred through tubes 21 and 21′ from a single source or individual sources thence applied to diaphragms 22 and 22′ may maintain the system of dynamic seals to the outer faces of rotor 1 as hereinbefore described, and a source of controlled fluid pressure applied through pressure port 9 to the exterior parts of said rotor may exclude fluids and particles from cavities between exterior surfaces of rotor pockets and the interior of cylindrical body member 3′, thus confining fluids and particles within the operational limits of the transfer system.

Additional ports, not shown, may be provided in upper and lower plates 8 and 8′ for such operations as evacuating, venting, pressuring, washing, and the like.

The central angle of rotation of rotor 1 may vary from 180° to include rotations through such central angles as those corresponding to consecutive pocket centers, and further that the rotary motion of rotor 1 may be continuous or intermittent.

Having thus disclosed my invention I claim:

1. A rotary valve comprising, a rotor having a plurality of concentrically disposed vertical cylindrical pockets, a shaft fixed therein with means driving said shaft, a vertical cylindrical enclosure surrounding said rotor, upper and lower horizontal plates journaled and sealed on said shaft and attached and sealed against the ends of said cylindrical enclosure by a seal therein, a plurality of ports providing outlets and inlets in said plates, said ports concentrically arranged in said plates to coincide with an end of said pockets, continuous diaphragm means interposed between said plates and said rotor stationary relative to the movement of said rotor, openings in said diaphragm means corresponding to each of said ports, variable fluid pressure means urging said diaphragm means against outer faces of said rotor, variable fluid pressure means for applying pressure within said cylindrical enclosure against the seal of said horizontal plates and said cylindrical enclosure, mechanical means for compensating the downward pressure of said shaft and rotor.

2. The device as claimed in claim 1 wherein one of said ports is an inlet port and contains a partition of enlongate and closely spaced flexible members extending into a corresponding pocket, the spaces between said members being such to allow the flow of small particles and liquid therethrough after the flow of larger particles has ceased.

3. The device as claimed in claim 1 wherein a flat screening device is placed at the outlet end of at least one of said pockets, thereby preventing the flow of large solid particles therethrough.

References Cited by the Examiner

UNITED STATES PATENTS

| | | | |
|---|---|---|---|
| 31,530 | 2/1861 | Cluxton | 222—370 X |
| 2,314,031 | 3/1943 | Colburn | 222—370 X |
| 2,413,293 | 12/1946 | Colburn | 222—370 X |
| 2,503,233 | 4/1950 | Hall | 222—370 X |
| 2,590,817 | 3/1952 | Fenno | 222—352 X |
| 3,076,580 | 2/1963 | Heath | 222—370 X |
| 3,107,703 | 10/1963 | Smith | 222—189 X |
| 3,195,776 | 7/1965 | Helm et al. | 222—370 X |

RAPHAEL M. LUPO, *Primary Examiner.*

HADD S. LANE, *Examiner.*